US006703457B2

(12) United States Patent
van Baar et al.

(10) Patent No.: US 6,703,457 B2
(45) Date of Patent: Mar. 9, 2004

(54) PROPYLENE POLYMERS AND PROCESS FOR THE PREPARATION THEREOF

(75) Inventors: Jan F. van Baar, AB Uitgeest (NL); Andrew D. Horton, RC Amsterdam (NL); Peter A. Schut, PT Almere (NL); Johan Stapersma, MA Castricum (NL)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/031,583

(22) PCT Filed: May 21, 2001

(86) PCT No.: PCT/EP01/05800

§ 371 (c)(1), (2), (4) Date: Jan. 18, 2002

(87) PCT Pub. No.: WO01/90205

PCT Pub. Date: Nov. 29, 2001

(65) Prior Publication Data

US 2003/0130445 A1 Jul. 10, 2003

(30) Foreign Application Priority Data

May 24, 2000 (EP) .............................................. 00201844

(51) Int. Cl.$^7$ .......................... C08F 4/64; C08F 110/06; C08F 210/06
(52) U.S. Cl. ........................ 526/127; 526/113; 526/114; 526/115; 526/117; 526/127; 526/160; 526/170; 526/348; 526/351
(58) Field of Search ................................. 526/113, 114, 526/115, 117, 127, 160, 170, 348, 351

(56) References Cited

U.S. PATENT DOCUMENTS 6,258,903 B1 * 7/2001 Mawson et al. ............ 526/113

FOREIGN PATENT DOCUMENTS

| EP | 0575875 | 12/1993 | ........... C08F/4/642 |
| EP | 0778293 | 6/1997 | ........... C08F/10/00 |
| EP | 778 293 A2 * | 6/1997 | |
| WO | 9602580 | 2/1996 | ........... C08F/4/642 |
| WO | 9622995 | 8/1996 | ........... C07F/17/00 |
| WO | 9843989 | 10/1998 | ........... C07F/17/00 |
| WO | 9921899 | 5/1999 | ........... C08F/10/02 |
| WO | 0121674 | 3/2001 | ........... C08F/10/00 |

OTHER PUBLICATIONS

Resconi et al., J. Amer. Chem Soc. 120 (1998) 2308–2321.*
Resoni, L., Journal of Molecular Catalysis A: Chemical 146 (1999) 167–178.*
Resconi et al., Topics in Catalysis 7 (1999) 145–163.*
R. L. Augustine; Catalytic Hydrogenation; 3: 23–71 (1965).
J. Mar.; Adv. Organic Chemistry; 4$^{th}$ Edition, Chapter 5–9: 771–80 (1992).
L. Resconi et al., Macromolecules; 28(19): 6667–76 (1995).
P. M. Margl et al., J. Am. Chem. Society; 120(9): 2174–75 (1998).
E. Wasserman et al., Polymer Reprints; 39(2): 425–26 (1998).
L. Resconi et al., J. Am. Chem. Society; 120(10): 2308–21 (1998).
L. Resconi et al.; Topics in Catalysis; 7: 145–63 (1999).
L. Resconi; Journal of Molecular Catalysis; 146: 167–78 (1999).

* cited by examiner

Primary Examiner—Roberto Rabago

(57) ABSTRACT

A process for preparing propylene polymer comprising contacting, under polymerization conditions, propylene and optionally ethylene, with a catalyst system comprising a bridged metallocene and a suitable activating cocatalyst, said process being characteized by reducing the concentration of hydrogen formed during the polymerization reaction.

20 Claims, No Drawings

PROPYLENE POLYMERS AND PROCESS FOR THE PREPARATION THEREOF

This application is the U.S. national phase of International Application PCT/EP01/05800, filed May 21, 2001.

The present invention relates to propylene polymers, optionally containing up to 5 mol % of ethylene, having a number of internal vinylidene unsaturations per polymer chain greater than or equal to 2; these polymers are obtained by removing at least a part of hydrogen present in the polymerization apparatus during the process.

It is known that polypropylene, although possessing good physicomechanical properties and excellent chemical resistance, lack highly desirable properties, such as varnishability, dyeing adhesion and compatibility with other polymers or inorganic substrates because of the apolar and saturated nature. Introducing a high number of unsaturations in the polymer chain therefore could be a way for obtaining a functionalizable polymer and for eliminating these disadvantages. It is known that the polymerization of olefins carried out with metallocene complexes gives rise to evolution of molecular hydrogen. For instance J. Am. Chem. Soc. 1998, 120, 2174–2175 shows that gas-phase reactions between ethylene or an alpha-olefin and $Cp_2ZrCH_3^+$ during mass spectroscopic studies result in elimination of molecular hydrogen with concomitant formation of an eta-3-allyl complex. This evolution has been associated with the formation of unsaturations in the polymer chain. Formation of internal unsaturations in the polymer chain in ethylene/alpha-olefin copolymers produced with metallocenes is reported in Polymers Preprints 1998, 39(2), 425. However these documents do not relate to propylene polymerization and moreover, in these documents, there is no indication that the nature and the number of internal unsaturation in a propylene polymer may be controlled. Chain transfer reactions in polypropylene polymerization have been investigated by Resconi at al. in Topics in Catalyst 1999, 7, 145–163, but he does not relate to hydrogen produced during the polymerization reactions.

EP 778293 relates to a process for producing an olefin polymer where an olefin is polymerized in the presence of a metallocene complex; by forced removing hydrogen during the polymerization process, it is possible to obtain an olefin polymer having a desired melt index. In this document the presence of hydrogen in the process is explained by the formation of unsaturated bonds at the terminal end of olefin polymer, no reference being made to internal unsaturations; moreover only ethylene/1-hexene is polymerized in the examples. The Applicant has now unexpectedly found a new propylene polymer, optionally containing up to 5 mol % of ethylene, having the following characteristics:

i) molecular weight distribution $(M_w/M_n) \leq 4$;
ii) number of internal vinylidene per polymer chain $\geq 2$.

The propylene polymer object of the present invention is obtainable with a polymerization process carried out in the presence of a metallocene-based catalyst system, by selectively removing at least part of hydrogen present in the polymerization apparatus during the polymerization process. More specifically, it is another object of the present invention a process for preparing the above described propylene polymers comprising contacting, under polymerization conditions, propylene and optionally ethylene, with a catalyst system comprising:

a) a metallocene complex of formula (I)

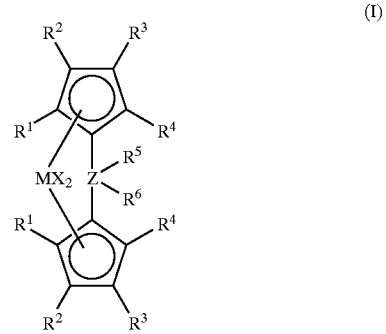

wherein:

M is titanium zirconium or hafnium; preferably M is zirconium;

the groups X equal to or different from each other, are monoanionic sigma ligands selected from the group consisting of hydrogen, halogen, —R, —OR, —OCOR, —OSO$_2$CF$_3$, —SR, —NR$_2$ and —PR$_2$, wherein R is a linear or branched $C_1$–$C_{20}$ alkyl, $C_2$–$C_{20}$ alkenyl $C_3$–$C_{20}$ cycloalkyl, $C_6$–$C_{20}$ aryl, $C_7$–$C_{20}$ alkylaryl or $C_7$–$C_{20}$ arylalkyl radical; preferably R is methyl, ethyl, propyl, butyl or phenyl; preferably X is halogen or $C_1$–$C_{20}$ alkyl;

the groups $R^1$, $R^2$, $R^3$ and $R^4$, equal to or different from each other, are selected from the group consisting of hydrogen, linear or branched $C_1$–$C_{20}$ alkyl, $C_2$–$C_{20}$ alkenyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing heteroatoms belonging to groups 13–17 of the Periodic Table; two or four adjacent groups $R^1$, $R^2$, $R^3$ and $R^4$ may form together one or more 3–6 membered aromatic or aliphatic rings, optionally substituted with hydrocarbyl radicals optionally containing heteroatoms belonging to groups 13–17 of the Periodic Table; preferably $R^1$, $R^2$, $R^3$ and $R^4$ are hydrogen or $C_1$–$C_{20}$ alkyl; optionally containing nitrogen, phosphorus or sulfur, or $R^1$ and $R^2$ form a six-membered aromatic or aliphatic ring;

with the proviso that either $R^1$ is different from $R^4$ or $R^2$ is different from $R^3$;

Z is a carbon or silicon atom; preferably Z is a carbon atom;

the groups $R^1$ and $R^6$, equal to or different from each other, are selected from the group consisting of hydrogen, linear or branched $C_1$–$C_{20}$ alkyl, $C_2$–$C_{20}$ alkenyl, $C_3$–$C_{20}$ cycloalkyl, $C_6$–$C_{20}$ aryl, $C_7$–$C_{20}$ alkylaryl and $C_7$–$C_{20}$ arylalkyl radical optionally containing heteroatoms belonging to groups 13–17 of the Periodic Table; $R^5$ and $R^6$ optionally form together a 3 to 6-membered ring; preferably $R^5$ and $R^6$ are selected from the group consisting of hydrogen, methyl, ethyl, propyl and phenyl; and b) a suitable activating cocatalyst;

said process being characterized by reducing the concentration of hydrogen formed during the polymerization reaction

DETAILED DESCRIPTION OF THE INVENTION

The number of internal vinylidenes per polymer chain is defined as the number of internal vinylidene bonds over the total number of unsaturated end groups. More precisely, the number of internal vinylidenes per polymer chain is the ratio between the number of bonds in a polymer chain having the following structure:

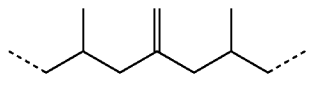

Vin II over the total number of unsaturated end groups in a polymer chain, having the following structures:

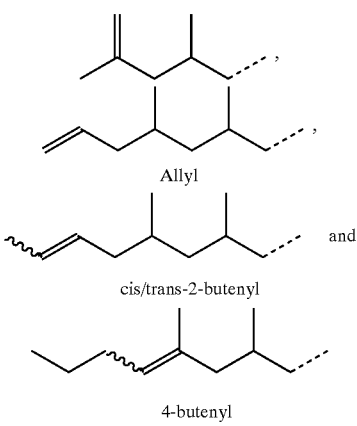

Vin I

Allyl and cis/trans-2-butenyl 4-butenyl

Using N.M.R. techniques, the skilled man in the art can carry out the analysis of the polymer in order to determine the content of internal vinylidene per polymer chain. Examples of N.M.R. assignments can be found in Topics in Catalysis 1999, 7, 145 and Journal of Molecular Catalysis 1999, 146, 167.

The propylene polymer, optionally containing up to 5 mol % of ethylene, object of the present invention has the following characteristics:

(i) molecular weight distribution ($M_w/M_n$) $\leq 4$, preferably $\leq 3$,
  more preferably $\leq 2.5$;
(ii) number of internal vinylidene per polymer chain $\geq 2$, preferably $\geq 2.5$, more preferably $\geq 3$.

Moreover, according to a preferred embodiment, the propylene polymers of the invention have the following characteristic:
iii) the isotactic pentads (mmmm), as determined by $^{13}$C-NMR analyses, are $\geq 80\%$.

According to another preferred embodiment, the propylene polymer of the invention, have the following characteristic:
iv) less than 0.5% of the $CH_2$ groups in the polymeric chain are in sequences $(CH_2)_n$ wherein n is an even number. The structure of the propylene polymer according to the invention appears to be highly regioregular. In fact, from the $^{13}$C-N.M.R. analysis (125.7 MHz) no signals are revealed as deriving from the $(CH_2)_n$ sequence where n is an even number.

Preferably the propylene polymers, object of the present invention, are obtainable by a process comprising contacting, under polymerization conditions, propylene and optionally ethylene with a catalyst system comprising:

a) a metallocene complex of formula (II)

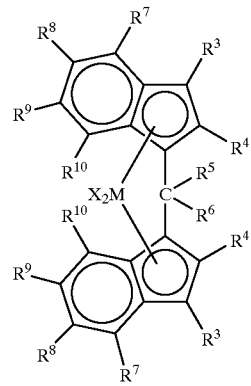

(II)

wherein
M, X, $R^3$, $R^4$, $R^5$ and $R^6$ have the meaning reported above and the groups $R^7$, $R^8$, $R^9$ and $R^{10}$, equal to or different from each other, are selected from the group consisting of hydrogen, linear or branched $C_1$–$C_{20}$ alkyl, $C_2$–$C_{20}$ alkenyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing heteroatoms belonging to groups 13–17 of the Periodic Table; preferably $R^7$, $R^8$, $R^9$ and $R^{10}$ are hydrogen, $C_1$–$C_{20}$ alkyl or $C_6$–$C_{20}$ aryl;
preferably $R^3$ is a group $SiR_3$ or $CR_3$, wherein R has the meaning reported above, $R^4$ is hydrogen; more preferably $R^3$ is $Si(CH_3)_3$ or $C(CH_3)_3$; and
b) a suitable activating cocatalyst;
said process being, characterized in that the concentration of the hydrogen formed during the polymerization reaction is reduced.

Metallocene complexes can be obtained with various processes known in the art such as, for example, as described in WO 96/22995 and WO 98/43989.

In the process of the invention, hydrogen can be suitably removed during the polymerization reaction by means of methods known in the art, such as:

1) by using a hydrogenation catalyst in the gas phase, able to catalytically hydrogenate olefins;
2) by using a hydrogenation catalyst in the liquid phase, able to catalytically hydrogenate olefins;
3) by physically removing hydrogen from the gas phase.

According to methods 1) and 2), hydrogen present in the polymerization reactor reacts with propylene monomer to produce propane. As a result, the concentration of hydrogen gas in the reaction system is decreased. At this time, the amount of the propane produced is small and it has substantially no adverse effect on the polymerization of propylene.

Examples of hydrogenation catalysts fit for method 1) are platinum- or palladium-based compositions, particularly preferred is platinum or palladium on alumina.

Preferably these catalysts are installed in the gas cap of the reactor.

Examples of hydrogenation catalysts fit for method 2) are cobalt- or nickel-based catalysts activated by trialkylaluminiums, such as cobalt(acetylacetonate) or nickel(octanoate); rhodium catalysts such as Wilkinson's catalyst (Rh(PPh$_3$)$_3$Cl); ruthenium catalysts, such as Ru(H)Cl(PPh$_3$)$_3$. Alternatively heterogeneous platinum, platinum oxide or palladium catalysts may be used as a suspension in the reaction medium.

Hydrogenation catalysts which can be used for methods 1) and 2) are described in "Catalytic Hydrogenation" (R. L. Augustine, publisher Dekker, New York, 1965) and in "Advanced Organic Chemistry", 4$^{th}$ Edition, p. 771–780 (J. March, publisher Wiley, New York, 1992). Once selected the hydrogenation catalyst, those skilled in the art can select the necessary amount of it depending on the catalyst activity, according to common procedures.

According to method 3), hydrogen can be physically removed from the reactor by using, for example, a solid or a liquid adsorbent which can selectively adsorb hydrogen or a hydrogen separating membrane that allows hydrogen to permeate; alternatively the gas cap of the reactor can be vented. The hydrogen concentration during the polymerization reaction, is reduced to less than 50%, preferably to less than 30% and more preferably to less than 20% of the hydrogen concentration in absence of means to reduce it (hydrogenation catalysts or physical means).

In other words, the hydrogen concentration in the reactor in the presence of hydrogenation means has to be less than 50% preferably less than 30% more preferably less than 20% of the hydrogen concentration that would be in the reactor under about the same reaction conditions but in absence of means for removing hydrogen. When the polymerization reaction is carried out in liquid phase, hydrogen concentration in the gas phase of the reactor (i.e. in the gas cap) can vary from 0 to 0.020% mol. more preferably from 0 to 0.015% mol.

Suitable activating cocatalysts according to the process of the invention are alumoxanes or compounds capable of forming an alkyl metallocene cation.

Alumoxane useful as cocatalyst (b) may be linear alumoxanes of the formula (III):

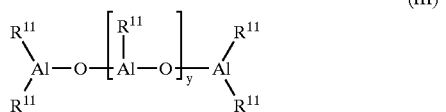

(III)

wherein $R^{11}$ is selected from the group consisting of halogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals and y ranges from 0 to 40;
or cyclic alumoxanes of the formula (V):

(IV)

wherein $R^{11}$ has the meaning herein described and y is an integer ranging from 2 to 40.

The above alumoxanes may be obtained according to procedures known in the state of the art, by reacting water with an organo-aluminum compound of formula $AlR^{11}_3$ or $Al_2R^{11}_6$, with the condition that at least one $R^{11}$ is not halogen. In this case, the molar ratios of Al/water in the reaction is comprised between 1:1 and 100:1. Particularly suitable are the organometallic aluminum compounds described in formula (II) of EP 0 575 875 and those described in formula (II) of WO 96102580. Moreover, suitable cocatalysts are those described in WO 99/21899 and in the European app. no. 99203110.4.

The molar ratio between aluminum and the metal of the metallocene complex is comprised between about 10:1 and about 20000:1, preferably between about 100:1 and about 10000:1, more preferably between 100:1 and about 5000:1.

Examples of alumoxanes suitable as activating cocatalysts in the process of the invention are methylalumoxane (MAO), tetra-isobutyl-alumoxane (TIBAO), tetra-2,4,4-trimethylpentyl-alumoxane (TIOAO) and tetra-2-methyl-pentylalumoxane. Mixtures of different alumoxanes can also be used. Not limiting examples of aluminum compounds of formula $AlR^{11}_3$ or $Al_2R^{11}_6$ are:

tris(methyl)aluminum, tris(isobutyl)aluminum, tris(isooctyl)aluminum, methyl-bis(isobutyl)aluminum, dimethyl(isobutyl)aluminum, tris(isohexyl)aluminum, tris(benzyl)aluminum, tris(tolyl)aluminum, tris(2,4,4-trimethylpentyl)aluminum, bis(2,4,4-trimethylpentyl) aluminum hydride, isobutyl-bis(2-phenyl-propyl) aluminum, diisobutyl-(2-phenyl-propyl)aluminum, isobutyl-bis(2,4,4-trimethyl-pentyl)aluminum, diisobutyl-(2,4,4-trimethyl-pentyl)aluminum, tris(2,3-dimethyl-hexyl)aluminum, tris(2,3,3-trimethyl-butyl) aluminum, tris(2,3-dimethyl-butyl)aluminum, tris(2,3-dimethyl-pentyl)aluminum, tris(2-methyl-3-ethyl-pentyl) aluminum, tris(2-ethyl-3-methyl-butyl)aluminum, tris(2-ethyl-3-methyl-pentyl)aluminum, tris(2-isopropyl-3-methyl-butyl)aluminum, tris(2,4-dimethyl-heptyl) aluminum, tris(2-phenyl-propyl)aluminum tris(2-(4-fluoro-phenyl)-propyl)aluminum and tris(2-(4-chloro-phenyl)-propyl)aluminum as well as the corresponding compounds where one or more of the hydrocarbyl groups is replaced by a hydrogen atom.

Particularly preferred aluminum compounds are trimethylaluminum (TMA), tris(2,4,4-trimethylpentyl) aluminum (TIOA), triisobutylaluminum (TIBA), tris(2,3,3-trimethyl-butyl)aluminum, tris(2,3-dimethyl-butyl)aluminum, tris(2-phenyl-propyl) aluminum, tris[2-(4-fluoro-phenyl)-propyl] aluminum and tris[2-(4-chloro-phenyl)-propyl]aluminum. Mixtures of different organometallic aluminum compounds and/or alumoxanes can also be used. In the catalyst system used in the process of the invention, both said metallocene complex and said alumoxane can be pre-reacted with an organometallic aluminum compound of formula $AlR^{11}_3$ or $Al_2R^{11}_6$, wherein $R^{11}$ has the meaning reported above.

Further suitable cocatalysts are those compounds capable of forming an alkylmetallocene cation; preferably, said compounds have formula $Y^+D^-$, wherein $Y^+$ is a Brønsted acid capable of donating a proton and of reacting irreversibly with a substituent X of the compound of formula (I) or (II), and $D^-$ is a compatible non-coordinating anion, capable of stabilizing the active catalytic species which result from the reaction of the two compounds, and which is sufficiently labile to be displaceable by an olefinic substrate. Preferably, the $D^-$ anion comprises one or more boron atoms. More preferably, the anion $D^-$ is an anion of formula $BAr_4^{(-)}$, wherein the Ar substituents, the same or different from each other, are aryl radicals such as phenyl, pentafluorophenyl, bis(trifluoromethyl)phenyl. Tetrakis-pentafluorophenyl-borate is particularly preferred. Moreover, compounds of formula $BAr_3$ can be conveniently used. The process for obtaining the propylene polymer of the present invention can also be carried out by depositing the metallocene complex of formula (I) or (II) or the reaction product of the the metallocene complex of formula (I) or (II) with a suitable cocatalyst, or the suitable cocatalyst and successively the metallocene complex of formula (I) or (II), on the inert support, such as silica, alumina, magnesium halides, olefin polymers or prepolymers (i.e. polyethylenes, polypropylenes or styrene-divinylbenzene copolymers). The thus obtained supported catalyst system, optionally in the presence of alkylaluminum compounds, either untreated or pre-reacted with water, can be usefully employed in gas-phase polymerization processes. The solid compound so obtained, in combination with further addition of the alkyl aluminum compound as such or prereacted with water, is usefully employed in gas phase polymerization. The polymerization process according to the present invention can be carried out in gaseous phase or in liquid phase, optionally in the presence of an inert hydrocarbon solvent either aromatic (such as toluene), or aliphatic (such as propane, hexane, heptane, isobutane and cyclohexane).

The polymerization temperature ranges from about 0° C. to about 250° C., preferably from 20° C. to 150° C., and more preferably from 40° C. to 90° C.

The molecular weight distribution can be varied by using mixtures of different metallocenes or by carrying out the polymerization in various steps differing in the polymerization temperature and/or in the concentration of the polymerization monomers.

Metallocene complex of formula (I) or (II) and the suitable cocatalyst may be contacted among them before the polymerization. The contact time may be comprised between 1 and 60 minutes, preferably between 5 and 20 minutes. The pre-contact concentrations for metallocene complex of formula (I) or (II) are comprised between $10^{-2}$ and $10^{-8}$ mol/l, whereas for the suitable cocatalyst they are comprised between 10 and $10^{-3}$ mol/l. The precontact is generally carried out in the presence of a hydrocarbon solvent and, optionally, of small amounts of monomer. The propylene polymers of the present invention can be crosslinked either by electron beam irradiation or with chemical reagents. The propylene polymers of the present invention are suitable for various kinds of applications, such as insulated wire and other electric parts, printed circuit boards, heat insulating materials, packaging materials and roofing materials, by introduction of functional groups by chemical means into the hydrocarbon structure for further advanced applications. A further advantage of the propylene polymers of the present invention is that the internal vinylidene unsaturations are not subjected to thermal degradation or oxidative degradation if compared with polyolefins having unsaturations on the backbone. The following examples are given for illustrative purposes and are not intended to limit the scope and spirit of the invention.

EXAMPLES

General Procedures and Characterizations:

Methylaluminoxane (MAO) was purchased from Witco as a 10% w/w solution in toluene. The metallocenes rac-$C_2H_4$(1-Ind)$_2$ZrCl$_2$ and rac-$C_2H_4$(4,5,6,7-tetrahydro-1-Ind)$_2$ZrCl$_2$ were synthesized according to EP-A-575,875. The metallocene rac-Me$_2$C(3-SiMe$_3$-Ind)$_2$ZrCl$_2$ was synthesized according to WO 96/22995. According to $^1$H-NMR spectroscopic measurements, the metallocenes were effectively pure rac isomers.

Toluene (Aldrich, anhydrous grade) was stripped with nitrogen overnight and dried with 4 Å molecular sieves ($H_2O$ level~5–8 ppm). Nitrogen and propylene (liquid, 12 bar) were purified over a BTS column containing a copper catalyst (BASF R3-11) as well as a column containing a mixed bed of molecular sieves (3 Å (bottom), 4 Å (mid part) and 13× (top)) to remove oxygen and water respectively ($O_2$ level~0.3 ppm, $H_2O$ level 0.5 ppm). Nitrogen and propylene feedstreams were continuously monitored at ppm level. AMS and Systech analyzers were used to determine the oxygen content. MCM analyzers were used to determine the water content. RGA3 (reduction gas analyzer; Trace Analytical) was used to determine the CO content (ppb range).

Gas cap composition during polymerizations was analyzed by means of an Orbisphere hydrogen analyzer (hydrogen gas cap composition at 15 s intervals) and also using a GC-apparatus from Interscience propane/propylene ratio at 1 minute intervals). The GC determinations were performed using a GC 8000 chromatograph with a wide bore ($Al_2O_3$/KCl) capillary column under isothermal conditions. The components were detected by means of a flame ionization detector (FID) and/or thermal conductivity detector (TCD).

Gel Permeation Chromatography (GPC) Analysis

High-temperature GPC analyses were carried out using a Waters 150 CV instrument. A single solution of each sample was prepared by adding 15 ml of solvent to ca. 30 mg of sample and refluxing gently for 20 minutes. The solutions were then filtered through a fiber pad at 140° C. and part of each filtered solution transferred into special glass sample vials. The vials were then placed in a heated sample compartment and after an initial delay of 20 minutes to allow the samples to equilibrate thermally, injection of part of the contents of each vial was carried out automatically in series.

The following chromatographic conditions were used:

| | |
|---|---|
| Column: | PLgel 2 × mixed bed-B, 30 cm, 10 microns |
| Solvent: | 1,2-dichlorobenzene with antioxidant |
| Flow rate: | 1.0 ml/minutes |
| Temperature: | 140° C. |
| Detector: | refractive index |
| Calibration: | polystyrene |

NMR Characterization $^1$H and $^{13}$C NMR spectra of the propylene polymers were recorded in 1,2,4-trichlorobenzene or 1,2-dichlorobenzene solution at 130° C. (500 M for $^1$H and 125.7 MHz for $^{13}$C NMR). NMR data are listed in parts per million downfield from MS for proton and carbon, residual hydrogen resonances in the solvent being used for reference. The degree of regioregularity (sum of threo- and erythro-2,1-insertions and 1,3-insertions) and stereospecificity (mmmm) were determined by $^{13}$C NMR spectroscopy using standard procedures, as detailed in Macromolecules 1995, 28, 6667 and references therein.

The relative amounts of the different unsaturated end groups and internal vinylidene group (vin II) per chain were determined by $^1$H NMR spectroscopy. The total number of unsaturated end groups per chain was normalized to 1.0. The number of vin II groups per chain was determined as the ratio of the vin II groups to the total unsaturated end groups. The assignments were determined as described in Topics in Catalysis 1999, 7, 145 and in Journal of Molecular Catalysis 1999, 146, 167.

The following assignments are used ($^1$H NMR, solvent 1,2-$C_2D_4C_{12}$, temperature 130° C., internal reference TMS).

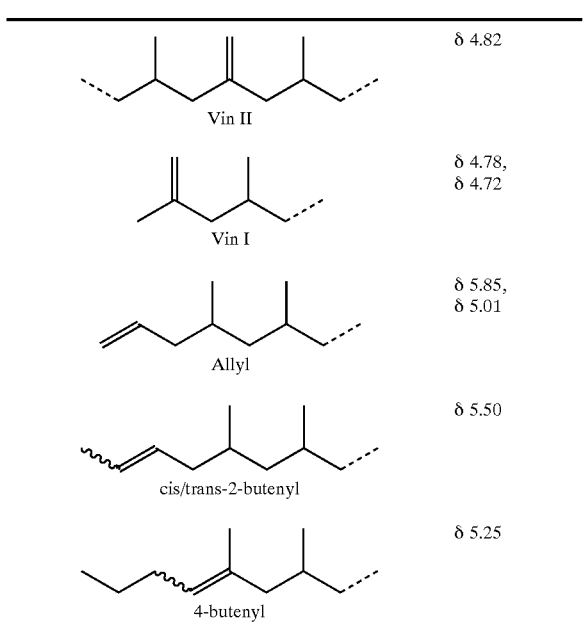

Polymerization Procedure

Contact of the above mentioned materials with water and oxygen was minimized by conducting the chemical reactions in a dry nitrogen atmosphere in a glovebox, under Schlenk conditions or in bottles provided with a septum cap.

Batch polymerization reactions were carried out in a 5 liters reactor provided with a turbine stirrer. A steam/water system was used for temperature control. Exotherms were monitored by determining (thermocouple) the temperature difference between the reactor contents and the incoming cooling water.

Example 1

This example illustrates the application of a supported platinum hydrogenation catalyst, which was installed in the gas cap of the reactor. The hydrogenation catalyst consisted of pellets of 1% Pt on alumina (ca. 20 g) enveloped in a stainless steel gauze, which was mounted just underneath the lid of the reactor to prevent contact with the liquid phase.

The 5 liter reactor was heated to 150–160° C. overnight, whilst purging with nitrogen, cooled and then pickled at 70° C. using a mixture of triisobutyl aluminum (TIBA, 0.25 g), toluene (20 ml) and propylene (500 g). The pickle mixture was removed and the reactor then charged with 1650 g liquid propylene, whilst increasing the temperature from 20° C. to 50° C. A solution of MAO in toluene (4.74 g of 4.95% wt solution; 8.69 mmol) was then introduced into the reactor using an injection system and washed in using 20 ml of toluene.

Meanwhile, rac-Me$_2$Si(3-SiMe$_3$-Ind)$_2$ZrCl$_2$ (13.1 mg, 22.7 μmol) was dissolved in toluene (12.5 g), and the obtained solution was reacted with MAO (6.20 g of 4.95% wt solution). 10 minutes after the introduction of the hydrolyzed alkylaluminium mixture into the reactor, 0.411 g of the catalyst solution (aged for 5 minutes; 0.50 μmol) was injected into the reactor (using 20 ml toluene) and the polymerization was continued using 840–1100 rpm stirring. The hydrogen concentration increased within ca. 15 minutes to a constant level of 0.004% mol (gas cap). The polymerization was stopped after 300 minutes by injection of 5–10 ml methanol. The heating was then discontinued and the propylene rapidly vented and the powder polypropylene collected. The polypropylene was dried (70–80° C., 200 mbar, nitrogen purge) giving the yield of product The polymerization conditions are reported in table 1, while the data relating to the obtained polymers are indicated in Table 2.

Example 2

Example 2 was performed similarly to Example 1, but with a higher catalyst intake. The catalyst and cocatalyst intake, polymerization conditions and the data relating to the obtained polymers are summarized in Tables 1 and 2. The hydrogen concentration increased within ca. 10 minutes to a constant level of 0.010% mol (gas cap).

Example 3

Example 3 illustrates the application of a hydrogen flashing procedure to remove hydrogen from the reactor. The procedure was similar to Example 1, except that the platinum hydrogenation catalyst was omitted. The catalyst and cocatalyst intake, polymerization conditions and the data relating to the obtained polymers are summarized in Tables 1 and 2. After injection of the catalyst, the gas cap (primarily propylene) was allowed to vent slowly. The hydrogen concentration increased within ca. 3 minutes to a constant level of 0.013% mol (gas cap). The polymerization was terminated after 30 minutes using a methanol kill as described in Example 1.

Example 4

Example 4 illustrates the application of a platinum oxide hydrogenation catalyst utilized as a slurry in liquid propylene. The procedure was similar to Example 1, except that the gas phase platinum catalyst was omitted and a toluene slurry of PtO$_2$ (20 g, containing 220 mg of PtO$_2$) was injected prior to addition of the liquid propylene, and additional amounts of catalyst (as a slurry in 20 g of toluene) were added 35 minutes and 50 minutes after catalyst injection (55 mg and 110 mg PtO$_2$, respectively). The catalyst and cocatalyst intake, polymerization conditions and the data relating to the obtained polymers are summarized in Tables 1 and 2. The hydrogen concentration slowly increased during the course of the polymerization to a final level of 0.015% mol (in the gas cap).

Example 5

Example 5 was performed similarly to Example 1, but with a low level of added ethylene (0.12% mol, gas cap). As in Example 1 a Pt/alumina catalyst in the gas cap was utilized for hydrogen removal. The catalyst and cocatalyst intake, polymerization conditions and the data relating to the obtained polymers are summarized in Tables 1 and 2. Hydrogen concentration increased within ca. 10 minutes to a constant level of 0.010% mol in the gas cap.

Comparative Example 6

Comparative Example 6 was performed similarly to Example 1, but without removal of hydrogen. The catalyst and cocatalyst intake, polymerization conditions and the data relating to the obtained polymers are summarized in Tables 1 and 2. Hydrogen concentration increased within ca. 25 minutes to a constant level of 0.07% mol in the gas cap.

Comparative Example 7

Comparative Example 7 was performed similarly to Example 1, but with rac-C$_2$H$_4$(1-Ind)$_2$ZrCl$_2$ as catalyst precursor instead of rac-Me$_2$Si(3-SiMe$_3$-Ind)$_2$ZrCl$_2$. As in Example 1 a Pt/alumina catalyst in the gas cap was utilized for hydrogen removal. The polymerization conditions are reported in Table 1, while the data relating to the obtained polymers are indicated in Table 2. Hydrogen concentration increased within ca. 10 minutes to a constant level of 0.013% mol in the gas cap.

Comparative Example 8

Comparative Example 8 was performed similarly to Example 1, but with rac-C$_2$H$_4$(4,5,6,7-tetrahydro-1-Ind)$_2$ZrCl$_2$ as catalyst precursor and without removal of hydrogen. The catalyst and cocatalyst intake, polymerization conditions and the data relating to the obtained polymers are summarized in Tables 1 and 2.

TABLE 1

| Example | Metallocene | Metallocene amount (µmol) | Al/Zr (mol/mol) | Cocatalyst (MAO) Premix (mmol) | Reactor (mmol) | T °C. | Means for reducing hydrogen | Hydrogen in gas cap % mol, | % hydrogen reduced | Yield (g. PP) | Activity (Kg PP/g Zr. h) |
|---|---|---|---|---|---|---|---|---|---|---|---|
| 1 | A | 0.50 | 17900 | 0.250 | 8.69 | 50 | Pt | 0.004 | 90 | 125 | 548 |
| 2 | A | 1.00 | 9000 | 0.500 | 8.69 | 50 | Pt | 0.010 | 80 | 68 | 471 |
| 3 | A | 3.00 | 3000 | 1.494 | 7.50 | 50 | Vented | 0.013 | 80 | 30 | 389 |
| 4 | A | 2.00 | 4800 | 1.000 | 8.69 | 50 | PtO$_2$ | 0.015 | 70 | 73 | 218 |
| 5* | A | 0.50 | 17900 | 0.250 | 8.69 | 50 | Pt | 0.010 | 75 | 37 | 749 |
| Comp. 6 | A | 3.00 | 3000 | 1.494 | 7.50 | 50 | None | 0.070 | 0 | 230 | 776 |
| Comp. 7 | C | 1.00 | 9300 | 0.515 | 8.74 | 50 | Pt | 0.013 | 60 | 130 | 1425 |
| Comp. 8 | B | 4.00 | 2700 | 2.000 | 8.69 | 50 | None | 0.002 | 0 | 280 | 767 |

A = rac-Me$_2$C(3-SiMe$_3$-1-Ind)$_2$ZrCl$_2$
B = rac-C$_2$H$_4$(4,5,6,7-tetrahydro-1-Ind)$_2$ZrCl$_2$
C = rac-C$_2$H$_4$(1-Ind)$_2$ZrCl$_2$
*propylene/ethylene copolymer

TABLE 2

| Example | M$_n$ (×10$^{-3}$) | M$_w$ (×10$^{-3}$) | M$_w$/M$_n$ | 2,1 + 1,3 insertion (%) | Mmmm (%) | Unsaturated end groups | | | | Vin II/chain |
|---|---|---|---|---|---|---|---|---|---|---|
| | | | | | | Vin I | Allyl | 4-Butenyl | c/t-2-Butenyl | |
| 1 | 46.4 | 86.6 | 1.9 | 0 | 83.8 | 1.00 | 0 | 0 | 0 | 3.12 |
| 2 | 34.4 | 86.1 | 2.5 | 0 | 84.3 | 0.92 | 0.08 | 0 | 0 | 2.63 |
| 3 | 43.2 | 85.4 | 2.0 | 0 | 83.9 | 1.00 | 0 | 0 | 0 | 2.96 |
| 4 | | | | 0 | 83.5 | 0.87 | 0.13 | 0 | 0 | 3.41 |
| 5* | 40.8 | 75.6 | 1.9 | | | 1.00 | 0 | 0 | 0 | 3.02 |
| Comp 6 | 42.0 | 88.1 | 2.1 | 0 | 84.2 | 1.00 | 0 | 0 | 0 | 0.74 |
| Comp 7 | 19.6 | 39.2 | 2.0 | 0.65 | 84.6 | 0.3 | 0.04 | 0.11 | 0.55 | 0.20 |
| Comp 8 | 12.0 | 27.8 | 2.3 | 1.03 | 85.7 | 0.73 | 0.02 | 0.04 | 0.21 | 0.17 |

*propylene/ethylene copolymer

What is claimed is:

1. A propylene polymer, optionally containing up to 5 mol % of ethylene comprising:

i) a molecular weight distribution (M$_W$/M$_n$) ≦4;

ii) a number of internal vinylidene per polymer chain ≧2.

2. The propylene polymer according to claim 1 wherein the molecular weight distribution (M$_W$/M$_n$) is ≦3.

3. The propylene polymer according to claim 1 wherein the number of internal vinylidene per polymer chain is ≧2.5.

4. The propylene polymer according to claim 1 wherein isotactic pentads (mmmm), as determined by $^{13}$C-NMR analyses are ≧80%.

5. The propylene polymer according to claim 1 wherein less than 0.5% of CH$_2$ groups in a polymeric chain are in sequences (CH$_2$)$_n$, wherein n is an even number.

6. A process for preparing a propylene polymer, optionally containing up to 5 mol % of ethylene, comprising:

i) a molecular weight distribution (M$_W$/M$_n$) ≦4;

ii) a number of internal vinylidene per polymer chain ≧2 the process comprising contacting, under polymerization conditions, propylene and optionally ethylene, with a catalyst system comprising:

a) a metallocene complex of formula (I)

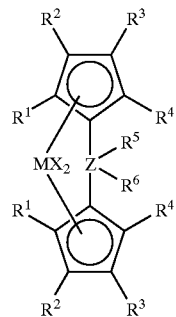

wherein:

M is titanium, zirconium or hafnium;

the groups X, equal to or different from each other, are monoanionic sigma ligands chosen from hydrogen, halogen, —R, —OR, —OCOR, —OSO$_2$CF$_3$, —SR, —NR$_2$ and —PR$_2$, wherein R is a linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl or C$_7$–C$_{20}$ arylalkyl radical;

the groups R$^1$, R$^2$, R$^3$ and R$^4$, equal to or different from each other, are chosen from hydrogen, linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing heteroatoms belonging to groups 13–17 of the Periodic Table;

two or four adjacent groups R$^1$, R$^2$, R$^3$ and R$^4$ optionally form together one or more 3–6 membered aromatic or aliphatic rings, optionally substituted with hydrocarbyl radicals optionally containing heteroatoms belonging to groups 13–17 of the Periodic Table;

with the proviso that either R$^1$ is different from R$^4$ or R$^2$ is different from R$^3$;

Z is a carbon or silicon atom;

the groups R$^5$ and R$^6$, equal to or different from each other, are chosen from hydrogen, linear or branched, C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl and C$_7$–C$_{20}$ arylalkyl radicals; optionally containing heteroatoms belonging to groups 13–17 of the Periodic Table; R$^5$ and R$^6$ optionally form together a 3 to 6 membered ring; and b) a suitable activating cocatalyst;

wherein a concentration of hydrogen formed during the polymerization reaction is reduced.

7. The process according to claim 6, wherein in the metallocene complex:

M is zirconium;

X is halogen or C$_1$–C$_{20}$ alkyl;

R$^1$, R$^2$, R$^3$ and R$^4$ are hydrogen or C$_1$–C$_{20}$ alkyl, or R$^1$ and R$^2$ form a six-membered aromatic or aliphatic ring;

Z is a carbon atom; and

R$^5$ and R$^6$ are chosen from hydrogen, methyl, ethyl, propyl and phenyl.

8. The process according to claim 6 wherein said metallocene complex has formula (II)

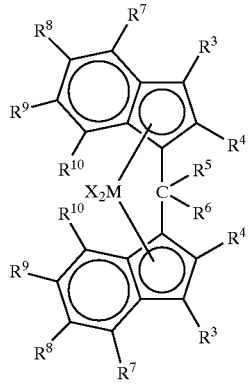

(II)

wherein:

M is titanium, zirconium or hafnium;

the groups X, equal to or different from each other, are monoanionic sigma ligands chosen from hydrogen, halogen, —R, —OR, —OCOR, —OSO$_2$CF$_3$, —SR, —NR$_2$, and —PR$_2$, wherein R is a linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl or C$_7$–C$_{20}$ arylalkyl radical;

the groups R$^3$ and R$^4$, equal to or different from each other, are chosen from hydrogen, linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing heteroatoms belonging to groups 13–17 of the Periodic Table, and two adjacent R$^3$ and R$^4$ optionally form together a 3–6 membered aromatic or aliphatic ring, optionally substituted with hydrocarbyl radicals optionally containing heteroatoms belonging to groups 13–17 of the Periodic Table;

the groups R$^5$ and R$^6$, equal to or different from each other, are chosen from hydrogen, linear or branched, C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl and C$_7$–C$_{20}$ arylalkyl radicals; optionally containing heteroatoms belonging to groups 13–17 of the Periodic Table, and optionally forming together a 3 to 6 membered ring; and the groups R$^7$, R$^8$, R$^9$ and R$^{10}$, equal to or different from each other, are chosen from hydrogen, linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing heteroatoms belonging to groups 13–17 of the Periodic Table.

9. The process according to claim 8, wherein, in the metallocene complex of formula (II), R$^3$ is a group SiR$_3$ or CR$_3$, wherein R is a linear or branched C$_1$–C$_{20}$ alkyl, C$_2$–C$_{20}$ alkenyl, C$_3$–C$_{20}$ cycloalkyl, C$_6$–C$_{20}$ aryl, C$_7$–C$_{20}$ alkylaryl or C$_7$–C$_{20}$ arylalkyl radical, R$^4$ is hydrogen and R$^7$, R$^8$, R$^9$ and R$^{10}$ are hydrogen, C$_1$–C$_{20}$ alkyl or C$_6$–C$_{20}$ aryl.

10. The process according to claim 9, wherein, in the metallocene complex of formula (II), R$^3$ is Si(CH$_3$)$_3$ or C(CH$_3$)$_3$.

11. The process according to claim 6 wherein the suitable activating cocatalyst is selected from alumoxane or compounds capable of forming an alkyl metallocene cation.

12. The process according to claim 6, wherein the concentration of hydrogen formed during the polymerization reaction is reduced by means of a hydrogenation catalyst in the gas phase.

13. The process according to claim 6, wherein the concentration of hydrogen formed during the polymerization reaction is reduced by means of a hydrogenation catalyst in the liquid phase.

14. The process according to claim 6, wherein the concentration of hydrogen formed during the polymerization reaction is reduced by physically removing hydrogen from the gas phase.

15. The process according to claim 12, wherein the hydrogenation catalyst is a platinum- or a palladium-based composition.

16. The process according to claim 15 wherein the hydrogenation catalyst is platinum or palladium on alumina.

17. The process according to claim 13 wherein the hydrogenation catalyst is chosen from cobalt- and nickel-based catalysts, rhodium and ruthenium catalysts, heterogeneous platinum, platinum oxide and palladium catalysts used as a suspension in the reaction medium.

18. The process according to claim 6 wherein the hydrogen concentration during the polymerization reaction is reduced to less than 50% of the hydrogen concentration in the absence of removing means.

19. The process according to claim 18 wherein the hydrogen concentration during the polymerization reaction is reduced to less than 30% of the hydrogen concentration in the absence of removing means.

20. The process according to claim 19 wherein the hydrogen concentration during the polymerization reaction is reduced to less than 20% of the hydrogen concentration in the absence of removing means.

* * * * *